(12) United States Patent
Low et al.

(10) Patent No.: US 9,639,852 B2
(45) Date of Patent: May 2, 2017

(54) GUI-BASED WALLET PROGRAM FOR ONLINE TRANSACTIONS

(75) Inventors: Gak Wee Low, Sunnyvale, CA (US); Salil Mody, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 12/237,060

(22) Filed: Sep. 24, 2008

(65) Prior Publication Data

US 2010/0076890 A1    Mar. 25, 2010

(51) Int. Cl.
| | | |
|---|---|---|
| G06Q 30/02 | (2012.01) | |
| G06Q 20/10 | (2012.01) | |
| G06Q 20/40 | (2012.01) | |
| G06Q 30/00 | (2012.01) | |
| G06F 3/0482 | (2013.01) | |
| G06Q 20/36 | (2012.01) | |
| G06Q 20/38 | (2012.01) | |
| G06Q 20/32 | (2012.01) | |
| G06F 3/0484 | (2013.01) | |
| G06Q 20/22 | (2012.01) | |

(52) U.S. Cl.
CPC ....... *G06Q 30/0226* (2013.01); *G06F 3/0482* (2013.01); *G06F 3/04842* (2013.01); *G06Q 20/10* (2013.01); *G06Q 20/227* (2013.01); *G06Q 20/3224* (2013.01); *G06Q 20/36* (2013.01); *G06Q 20/363* (2013.01); *G06Q 20/382* (2013.01); *G06Q 20/40* (2013.01); *G06Q 30/00* (2013.01); *G06Q 30/02* (2013.01); *G06Q 30/0222* (2013.01)

(58) Field of Classification Search
USPC ............................................... 705/44, 38, 35
See application file for complete search history.

(56) References Cited

U.S. PATENT DOCUMENTS

| | | | |
|---|---|---|---|
| 4,766,293 A * | 8/1988 | Boston ........................... 705/41 |
| 5,326,960 A * | 7/1994 | Tannenbaum ................. 235/379 |
| 5,650,604 A * | 7/1997 | Marcous et al. .............. 235/379 |
| 5,699,528 A | 12/1997 | Hogan |
| 5,937,396 A * | 8/1999 | Konya ............................ 705/43 |
| 5,963,647 A * | 10/1999 | Downing et al. ............... 705/39 |
| 6,010,067 A | 1/2000 | Elbaum |
| 6,502,747 B1 * | 1/2003 | Stoutenburg et al. ........ 235/379 |
| 6,736,314 B2 * | 5/2004 | Cooper et al. ................ 235/380 |
| 6,761,309 B2 * | 7/2004 | Stoutenburg et al. ........ 235/379 |
| 6,769,605 B1 * | 8/2004 | Magness ....................... 235/379 |
| 6,839,687 B1 | 1/2005 | Dent |
| 6,873,974 B1 * | 3/2005 | Schutzer ......................... 705/41 |
| 6,944,669 B1 * | 9/2005 | Saccocio ....................... 709/229 |
| 7,062,258 B1 * | 6/2006 | Sini et al. ................... 455/414.1 |
| 7,117,830 B1 | 10/2006 | Boyer et al. |
| 7,177,830 B2 * | 2/2007 | Shields et al. ................. 705/35 |
| 7,962,418 B1 * | 6/2011 | Wei et al. ....................... 705/65 |
| 8,744,959 B2 | 6/2014 | Smith |
| 2001/0027441 A1 | 10/2001 | Wankmueller |
| 2002/0032616 A1 * | 3/2002 | Suzuki et al. .................. 705/26 |

(Continued)

*Primary Examiner* — Beth V Boswell
*Assistant Examiner* — Benjamin S Fields
(74) *Attorney, Agent, or Firm* — Haynes and Boone, LLP

(57) ABSTRACT

Provided is a method and a GUI-based software application that acts as a wallet with network interconnectivity for enabling a user to securely and seamlessly conduct transactions with his or her online financial transaction program by means of a computer or a wireless handheld device without having to depend on an Internet browser.

20 Claims, 7 Drawing Sheets

(56) References Cited

U.S. PATENT DOCUMENTS

| | | | |
|---|---|---|---|
| 2002/0052842 A1* | 5/2002 | Schuba et al. | 705/40 |
| 2002/0065774 A1* | 5/2002 | Young et al. | 705/41 |
| 2002/0099656 A1* | 7/2002 | Poh Wong | 705/40 |
| 2002/0107755 A1* | 8/2002 | Steed et al. | 705/26 |
| 2002/0128977 A1 | 9/2002 | Nambiar | |
| 2002/0174065 A1* | 11/2002 | Coward | 705/39 |
| 2002/0179704 A1* | 12/2002 | Deaton | 235/383 |
| 2004/0024697 A1* | 2/2004 | Landa et al. | 705/39 |
| 2004/0148255 A1* | 7/2004 | Beck et al. | 705/39 |
| 2004/0162881 A1 | 8/2004 | Digate et al. | |
| 2005/0049964 A1 | 3/2005 | Winterer | |
| 2005/0187873 A1* | 8/2005 | Labrou et al. | 705/40 |
| 2005/0256802 A1* | 11/2005 | Ammermann et al. | 705/44 |
| 2006/0165060 A1* | 7/2006 | Dua | 370/352 |
| 2006/0212407 A1* | 9/2006 | Lyon | 705/71 |
| 2007/0162386 A1* | 7/2007 | Suzuki et al. | 705/39 |
| 2008/0010203 A1* | 1/2008 | Grant | 705/44 |
| 2008/0126945 A1 | 5/2008 | Munkvold | |
| 2009/0327114 A1 | 12/2009 | Sheth | |
| 2010/0076890 A1 | 3/2010 | Low et al. | |
| 2010/0262462 A1 | 10/2010 | Tryfon | |
| 2013/0339232 A1* | 12/2013 | Desai et al. | 705/41 |

* cited by examiner

FIG. 3

GUI-BASED WALLET PROGRAM FOR ONLINE TRANSACTIONS

FIELD OF THE INVENTION

The present invention relates to online, Internet-based financial transaction programs and commercial systems and more particularly to conducting online financial transactions with an Internet browser independent software application.

BACKGROUND OF THE INVENTION

With the advent of the Internet and online electronic commerce (e-commerce), financial transaction programs that allow users to seamlessly purchase products, transfer finds and conduct transactions over an Internet connection have been in high demand.

Traditional methods of executing financial transactions have been limited to a user providing his or her credit card, debit card, or checking account number on a commercial website, or using checks, money orders and other forms of paper-based payments. However, these means of executing financial transactions are often cumbersome, slow, and inconvenient, requiring a user to remember a multitude of account numbers, login data and passwords. This often results in significant time delays for payment processing. Furthermore, security and fraud concerns are prevalent. For instance, a user is often reluctant to provide sensitive credit card or debit card information over an Internet connection, regardless of how "secure" an Internet connection claims to be.

Recent financial transaction programs have emerged as a means for a user to pay for purchases, transfer money, receive money (if the user is a merchant), store shipping addresses, and set up multiple financial accounts (e.g. checking or savings, credit card, debit card) all with one single login and password. Security and fraud concerns are also mitigated by means of online financial security precautions, encryption methods, and anti-phising programs that are inherent in online, Internet-based financial transaction systems.

However, many of these financial transaction programs are limited in that users are dependent on an Internet browser in order to browse to a main website, enter their username and password data and access their account information in order to execute financial transactions such as paying for purchases, transferring money or checking account balances.

Users are limited in that they are dependent on a computer with Internet access and an Internet browser, or a wireless handheld device (e.g. cell phone, BlackBerry, PDA) with an Internet browser application installed. Problems arise if the Internet browser is broken. In that case, the user has no other means of accessing his or her online financial transaction program website. Furthermore, the level of user convenience for a given Internet browsing experience is limited to the specifications of the Internet browser. In other words, the user is stuck with the hard-to-locate buttons, keys or pull-down menus of a selected Internet browser, when the ideal alternative is a user-friendly Graphic User Interface (GUI) program with intuitive aesthetics and keys/buttons placed in regions optimal for user convenience.

Therefore, there is need for a method or software application with a user-friendly GUI setup that enables a user to access their online financial transaction program account without having to depend on an Internet browser. One such browser-independent solution is the use of a software application known as a "Widget", previously known as "Konfabulator". Widgets are basically software applications that use a JavaScript runtime environment coupled with an XML interpreter reading XML code to run miniature browser-independent GUI applications. Widgets also usually feature a flexible Application Programming Interface (API) for users and programmers to make their own Widgets. Typical Widgets include: weather forecast monitors, temperature or climate indicators, digital clocks, day planners, calendars, stock-tickers, sports game scoreboards, calculators and currency converters.

However, the one common feature shared by all Widgets is that they are all "passive" monitors, displayers or calculators of information. For instance, you only use a Widget to observe the weather, tell the time, convert currency rates, or be informed about the present status of a stock or the current score of a sports game. No Widget allows for direct interaction with the external world. For instance, a user cannot use a Widget to conduct financial transactions that have an actual impact on his or her bank account, which belongs in the physical external world. In other words, a user cannot use a Widget to transfer money from his/her bank account, withdraw funds, pay for bills, or perform other financial transactions that have an impact on the world outside of the user's computer.

Therefore, there is a need in the art for an Internet browser independent software application similar to Widget-based technology but which integrates a network-interconnectivity aspect and which also utilizes a user-friendly GUI configuration in order to allow a user to seamlessly and securely conduct financial transactions online with a computer or wireless handheld device without having to depend on an Internet browser.

SUMMARY OF THE INVENTION

Provided is a method and a GUI-based software application that acts as a wallet ("GUI Wallet") with network interconnectivity for enabling a user to securely and seamlessly conduct transactions with his or her online financial transaction program by means of a computer or a wireless handheld device without having to depend on an Internet browser.

First, the user opens the GUI Wallet and then inputs login information such as a username and a password. Then, a communication engine on the widget communicates the login information to the communication engine on the server of an online financial transaction program to see if the login information is valid by looking up relevant login information from a database If the login information is valid, then the server pulls up the user's relevant financial information. Then, the user is presented with a plurality of options in the form of buttons in a GUI Wallet.

On a first tab of the GUI Wallet, the user is presented with a plurality of buttons representing different funding sources (Cash/Checks, Visa, Debit Card and Reward Points) and the user's shipping address and other ID data. The user may drag-and-drop any of these buttons into the blank fields of a merchant's website, and the Wallet program then populates the fields with the relevant information (credit card number, shipping address, etc.).

On a second tab of the GUI Wallet, the user is presented with a plurality of buttons representing different types of transactions that can be performed with an online financial transaction program. These buttons may comprise transferring money, accepting payments or transfers, checking balances of accounts, paying for bills and converting currencies. Since the user has already logged in, all the relevant user ID and financial information is stored and ready for use. This enables a convenient means of performing financial transactions without having to re-enter login information and without having to rely on an Internet browser.

The GUI Wallet uses a communication engine to communicate with another communication engine located on the server of the online financial transaction program. The GUI Wallet sends encrypted data to the server's communication engine, which decrypts it. Then, the decrypted data is sent to an integration engine of the server, which interfaces with a plurality of databases to perform validation, complete transactions and check security. The databases store information such as login ID data, user financial data, blacklists of unsafe websites, reward point totals and transaction histories. Data sent back from the server to the GUI Wallet is also encrypted and then decrypted when received by the GUI Wallet.

Merchant sites can also be checked for security. If the site is a merchant site that is known for engaging in phishing or fraud, then the GUI Wallet will alert the user. A blacklist of unsafe sites is stored in one of the databases associated with the server of the online financial transaction program.

Further limitations and disadvantages of conventional and traditional approaches will become apparent to one of skill in the art, through comparison of such systems with the present invention as set forth in the remainder of the present application with reference to the drawings.

BRIEF DESCRIPTION OF THE FIGURES

FIG. 3 is a diagram showing using the GUI Wallet to drag-and-drop buttons into empty payment method fields of a merchant website according to another embodiment of the invention.

To allow cross-referencing among the figures, like elements in the figures are provided like reference numerals.

DETAILED DESCRIPTION

The following description is presented to enable any person skilled in the art to make and use the invention, and is provided in the context of particular applications of the invention. Various modifications to the disclosed embodiments will be apparent to those skilled in the art and the general principles defined herein may be applied to other embodiments and applications without departing from the spirit and scope of the invention.

According to embodiments of the invention, provided is a method and a GUI-based software "Wallet" application or a "GUI Wallet" with network interconnectivity for enabling a user to securely and seamlessly conduct transactions with his or her online financial transaction program by means of a computer or a wireless handheld device without having to depend on an Internet browser.

Figure 1:
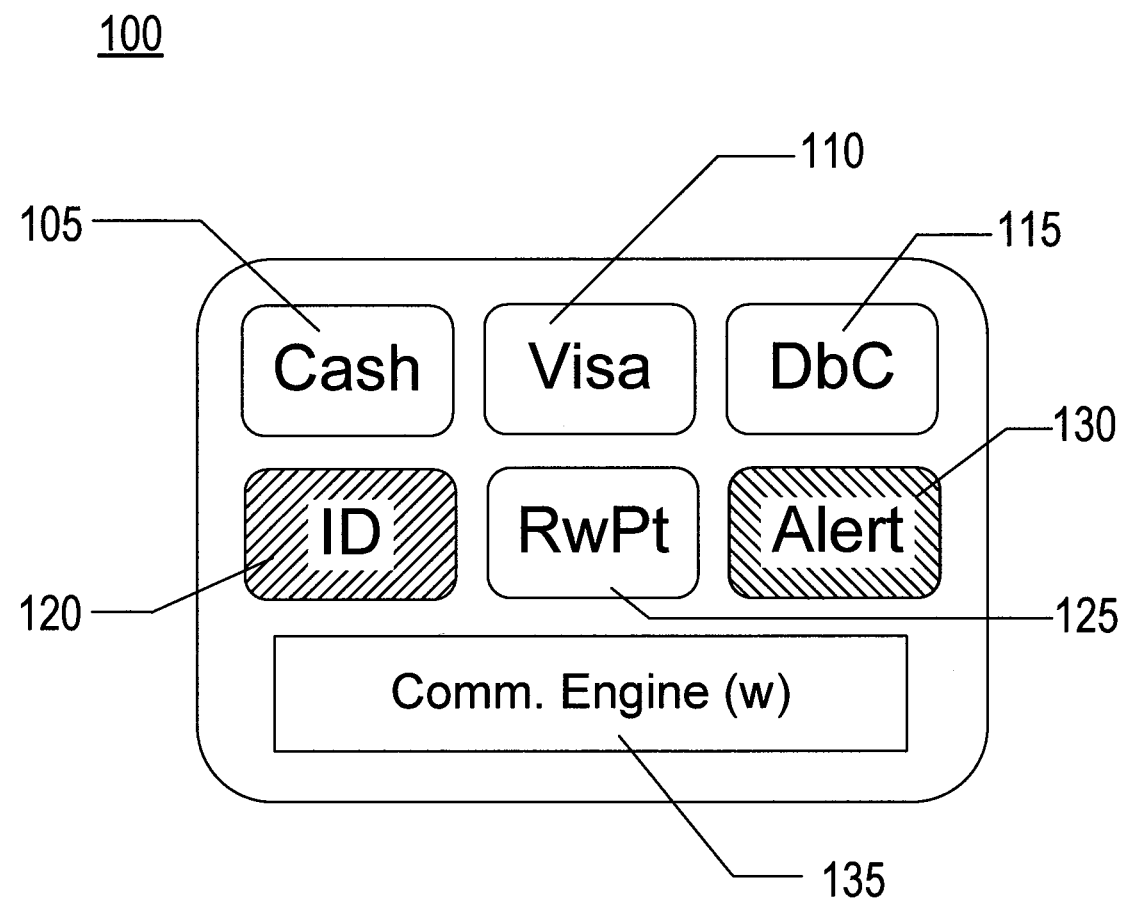
FIG. 1 is a diagram of a GUI Wallet with a first plurality of buttons according to an embodiment of the invention.

FIG. 1 is a diagram of a GUI Wallet with a first plurality of buttons on one or more tabs according to an embodiment of the invention. The first tab 100 of the GUI Wallet has a plurality of funding source buttons 105, 110, 115, 125, an ID button 120 and an alert button 130. Internal to the GUI Wallet software application is the communication engine W 135 of the GUI Wallet, which may be shown on the GUI interface of the GUI Wallet with some sort of GUI indicator, but is shown here in FIG. 1 as a generic icon. The plurality of funding source buttons can include, for example, a cash/check/money-order payment button 105 ("Cash"), a Visa or credit card payment button 110 ("Visa"), a debit card payment button 115 ("DbC"), and a reward point payment button 125 ("RwPt"), as shown in FIG. 1. However, the plurality of funding payment buttons is not limited to the aforementioned list, and the above list is not exhaustive in any way. The cash/check/money-order payment button 105 is tied to software in the GUI Wallet that stores the information about the payment or funding source, such as a user's check number, money order number, or the routing number, account number and name of the account holder of a checking account. The Visa or credit card payment button 110 is tied to software in the GUI Wallet that stores a user's credit card information such as credit card type, credit card number, name of cardholder, expiration date of card, and card security code. The debit card payment button 115 is tied to software in the GUI Wallet that stores a user's debit card information, which should be identical to the credit card information described above. Finally, the reward point payment button 125 is tied to software in the GUI Wallet that stores promotional code numbers, gift card or gift certificate numbers, reward point codes or other types of currency used in reward point systems. All the above data has already been entered by the user before. The drag-and-drop functionality of the funding source buttons will be further detailed in the description of FIG. 3.

The ID button 120 as shown in FIG. 1 stores ID information associated with the user. In other embodiments, a plurality of different ID buttons can be displayed and store different types of ID information associated with the user. ID information associated with the user may include, but is not limited to: the user's name (including any titles, department designators, suffixes, prefixes), the shipping address of the user, the billing address of the user, contact phone numbers of the user, and email addresses of the user. The ID button 120 is tied to software in the GUI Wallet that stores this ID information of the user, which has already been entered by the user previously. The drag-and-drop functionality of the ID source button 120 will be further detailed in the description of FIG. 2.

The alert button 130 alerts the user on a single issue as shown in FIG. 1. In other embodiments, a plurality of different alert buttons can be shown and alert the user on different issues. The list of issues that a user can be alerted on include, but is not limited to: whether a merchant site is "unsafe" or has a previous history of phising or fraud, whether the communication link established between the GUI Wallet and a given merchant site is secure, whether the user's ID information is correct and matches the user's records, whether a given transaction has been completed or has been successful, or whether a given transaction is not successful. An alert button 130 can also trigger pop-ups or message windows alerting the user of the aforementioned issues. The alert button 130 is tied to software of the GUI Wallet that alerts the user on the aforementioned list of issues.

The communication engine W 135 is the communication engine of the GUI Wallet, hence there is a "W" at the end of its name, to denote "Wallet". The communication engine W 135 communicates with a communication engine S 415 ("S" to denote "Server"), which is further described in FIG. 4. Even though the communication engine W 135 cannot be usually seen on the actual GUI Wallet and it is optional for the GUI Wallet to have an icon denoting the communication engine W 135, a GUI bar, light or box can be made to indicate to the user that the GUI Wallet is in the process of communicating with a server 410 (in FIG. 4) of the online financial transaction program by means of the communication engine W 135. This is almost like a flashing green "status indicator" light frequently seen on programs or devices that indicate that the program or device is engaging in a current communication with something else or is currently in a "busy" mode. The functionality of the communication engine W 135 and its interaction with the communication engine S 415 of the server 410 of the online financial transaction program will be further detailed in the description of FIG. 4.

Figure 2:
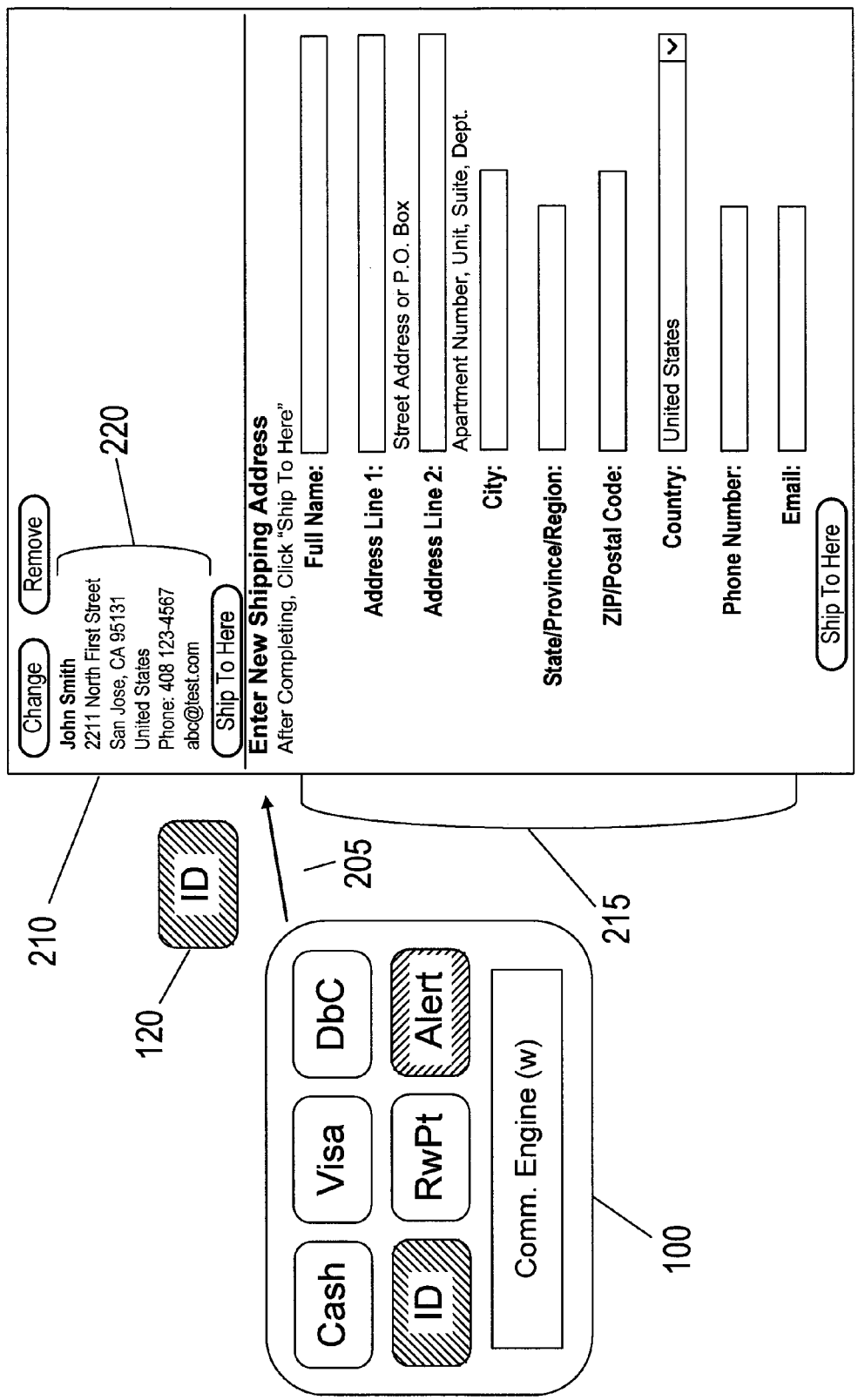
FIG. 2 is a diagram showing using the GUI Wallet to drag-and-drop buttons into empty shipping address or ID fields of a merchant website according to another embodiment of the invention.

FIG. 2 is a diagram showing using the GUI Wallet to drag-and-drop buttons into empty shipping address or ID fields of a merchant website according to one embodiment of the invention. A user can drag the ID button 120 from the first tab 100 of the GUI Wallet and drop it into a User ID Page 210 of a merchant website. The User ID Page 210 has a plurality of ID fields 215 (e.g. as shown in FIG. 2: Full Name, Address Line 1, Address Line 2, City, State/Province/Region, ZIP/Postal Code, Country, Phone Number, and Email). However, the plurality of ID fields 215 is not limited to the ID fields shown in FIG. 2 nor are the ID fields shown in FIG. 2 in any way exhaustive. Once the user has dragged-and-dropped the ID button 120 from the first tab 100 of the GUI Wallet to the User ID Page 210, the plurality of ID fields 215 are populated with the appropriate data. If the user has already entered ID information previously, dragging-and-dropping the ID button 120 from the first tab 100 of the GUI Wallet to the User ID Page 210 of the merchant website will result in a pre-entered user ID data 220 showing up on the User ID Page 210. After the ID information has been entered, the user can then confirm shipping to this address. The user can repeat a similar process for entering a billing address or other IDs if multiple ID buttons are used. The drag-and-drop functionality of the GUI Wallet is robust, simple and convenient, because it allows a user to simply drag-and-drop ID information from a portable GUI Wallet into a merchant website without having to remember a multitude of ID data (account numbers) and open up a separate Internet browser.

Figure 3:
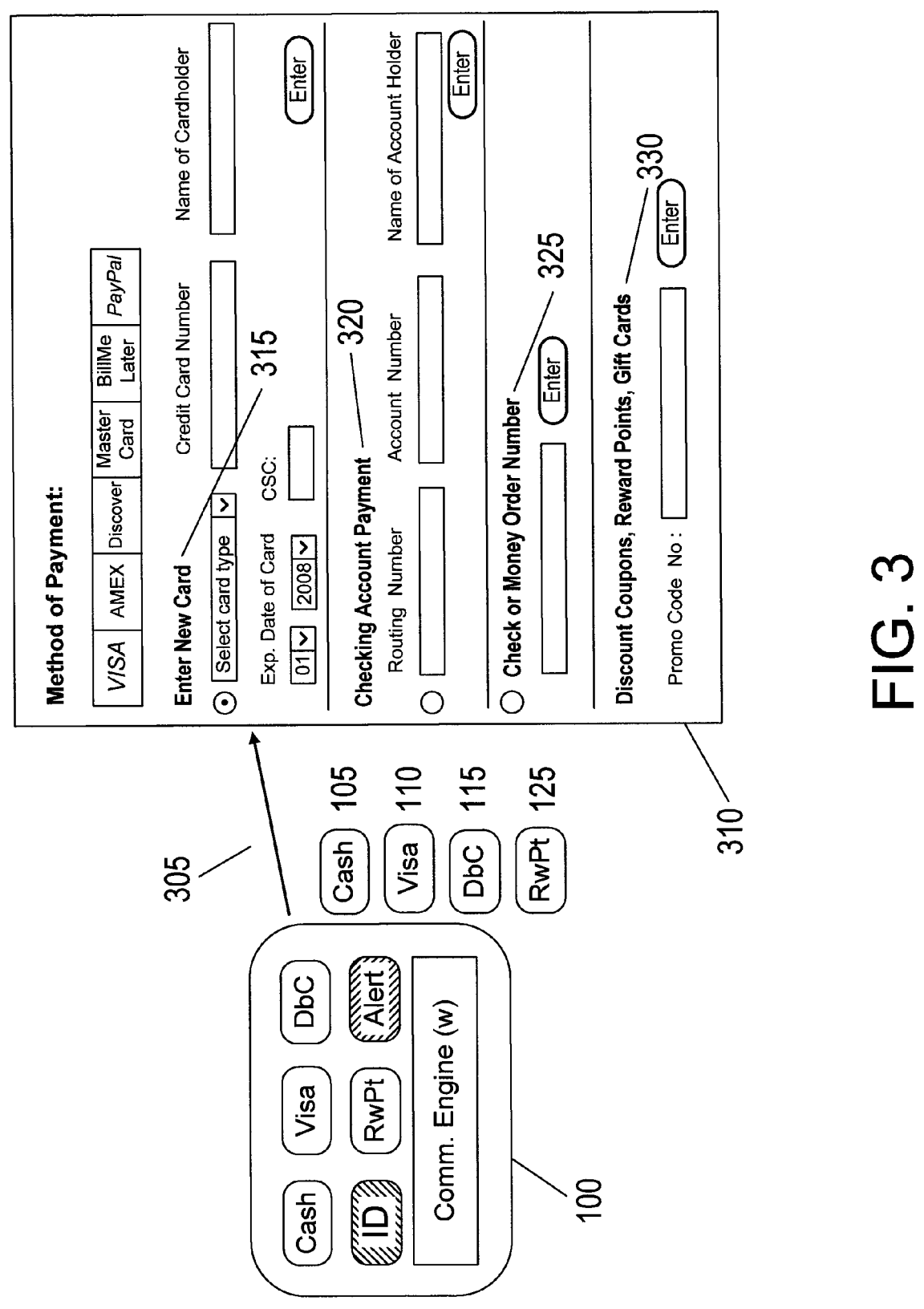

FIG. 3 is a diagram showing using the GUI Wallet to drag-and-drop buttons into empty payment method fields of a merchant website according to another embodiment of the invention. The first tab 100 of the GUI Wallet with the plurality of buttons has a plurality of finding source buttons, which include, as shown in FIG. 1, a cash/check/money-order payment button 105, a visa or credit card payment button 110, a debit card payment button 115, and a reward point payment button 125. A user can drag any of the aforementioned funding source buttons from the first tab 100 of the GUI Wallet and drop it into a Payment Method Page 310 of a merchant website. The Payment Method page 310 has a plurality of entry fields, including, as shown in FIG. 3, credit card or debit card entry fields 315, checking account entry fields 320, check or money order entry field 325, and reward point entry field 330. However, the plurality of entry fields is not limited to the entry fields as shown in FIG. 3 nor are the entry fields shown in FIG. 3 in any way exhaustive. Also, as described above for FIG. 1, the plurality of funding source buttons are not limited to the funding source buttons shown in FIG. 1 and are the list of funding source buttons in FIG. 1 are not in any way exhaustive.

Once the user has dragged-and-dropped any of the plurality of funding source buttons from the first tab 100 of the GUI Wallet to the Payment Method Page 310, the respective entry field is populated with the appropriate data. For instance, if the user drags-and-drops the cash/check/money-order payment button 105 from the GUI Wallet to a checking account entry field 320 or a check or money order entry field 325, those respective fields will be populated with the appropriate data (e.g. for the checking account entry field 320, the "Routing Number", "Account Number" and "Name of Account Holder" would be filled in with the user's data, and for the check or money order number, the field would be filled in with the user's data). Also, if the user drags-and-drops the Visa or credit card payment button 110 or the debit card payment button 115 from the GUI Wallet to a credit card or debit card entry field 315, then the relevant fields would be populated with the appropriate data (e.g. the "Card Type", "Credit Card Number", "Name of Cardholder", "Exp. Date of Card" and "CSC (Card Security Code)"). Finally, if the user drags-and-drops the reward point payment button 125 from the GUI Wallet to a reward point entry field 330, the field would be filled in with the user's data, e.g. a money order number or check number or other identifier. The sub-fields of the above mentioned entry fields (e.g. the "Routing Number", "Account Number" and "Name of Account Holder" are all sub-fields of the checking account entry field 320) are not limited to the sub-fields shown in FIG. 3, and can comprise other or different sub-fields, as appropriate. After the relevant payment information has been entered, the user can then confirm a selected payment method. The drag-and-drop functionality of the GUI Wallet is simple, robust and convenient, because it allows a user to simply drag-and-drop payment method information from a portable GUI Wallet into a merchant website without having to remember a multitude of ID data (account numbers) and open up a separate Internet browser.

Figure 4:
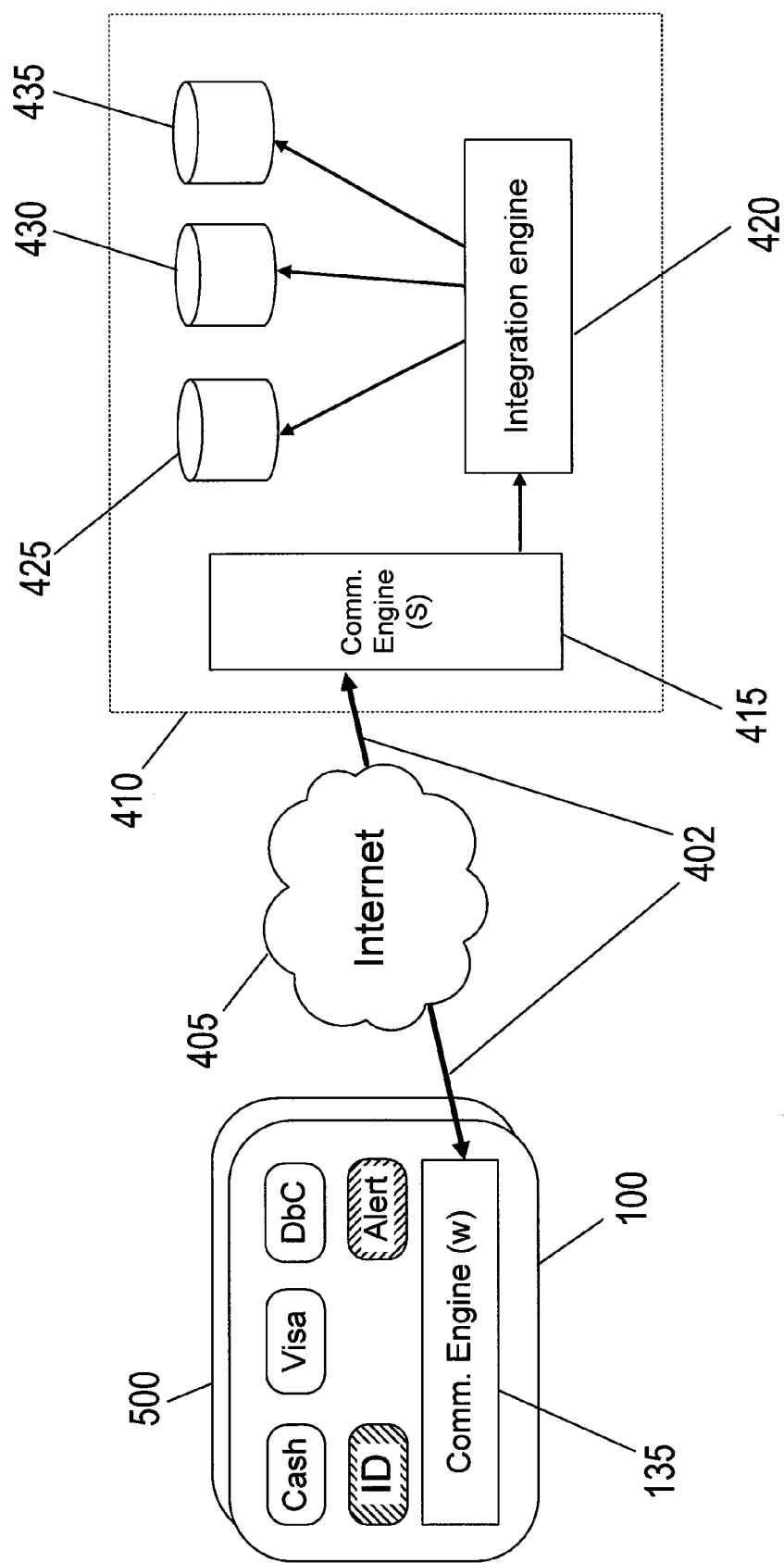
FIG. 4 is a diagram showing the connection between the communication engine of the GUI Wallet and the communication engine of a server associated with an online financial transaction program according to another embodiment of the invention.
Figure 5:
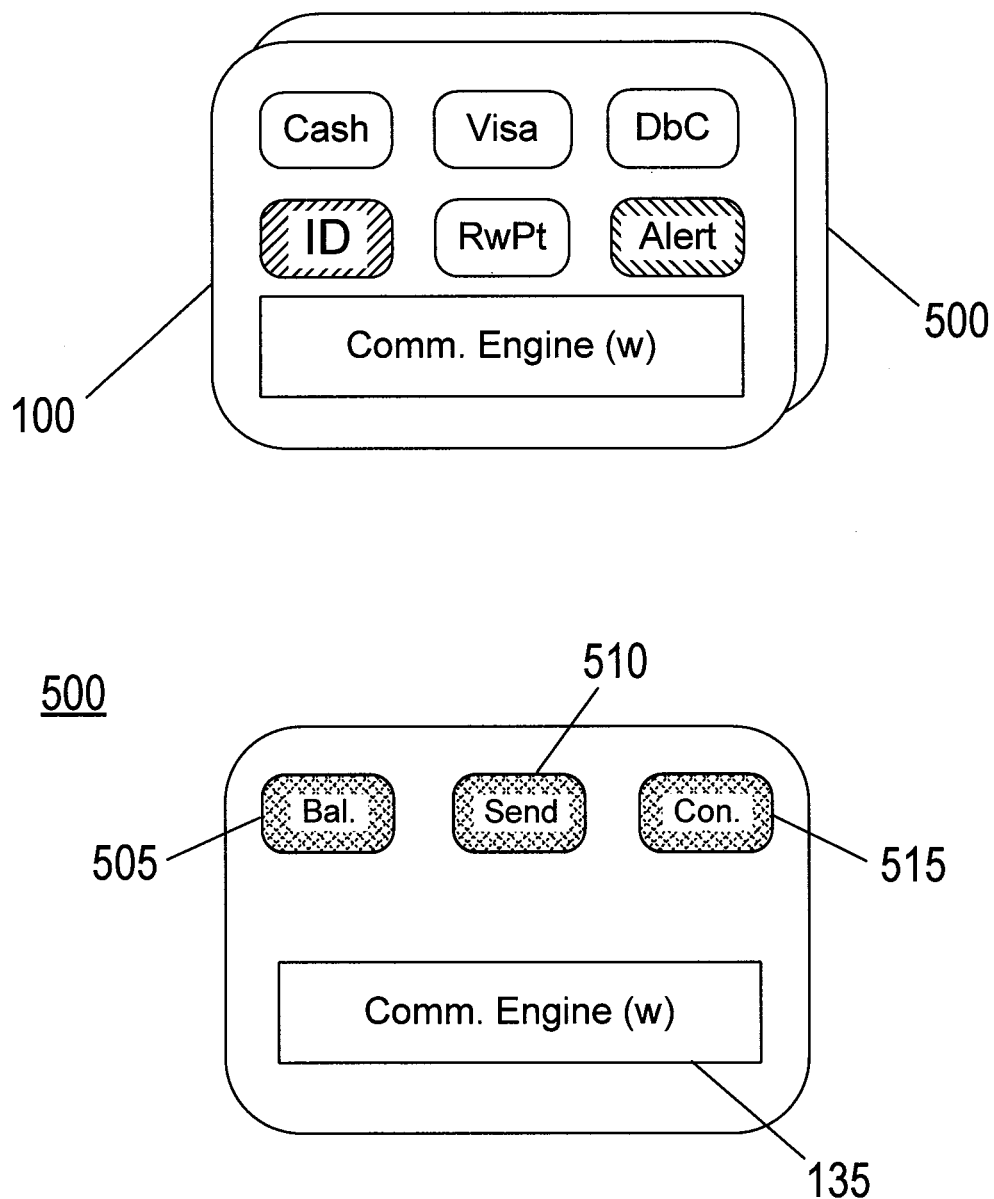
FIG. 5 is a diagram of a GUI Wallet with a second tab having a second plurality of buttons according to another embodiment of the invention.

FIG. 4 is a diagram showing the connection between the communication engine of the GUI Wallet and the communication engine of a server associated with an online financial transaction program according to another embodiment of the invention. The communication engine W 135 of the GUI Wallet comprising the first tab 100 shown in FIG. 1 and a second tab 500 shown in FIG. 5 is coupled to an Internet connection 405 to the communication engine S 415 of a server 410 of an online financial transaction program through a bi-directional communicational link 402. The server 410 of the online financial transaction program includes the communication engine S 415, an integration engine 420, and a plurality of databases, for example a user ID database 425, a financial data database 430 and an unsafe website blacklist database 435, as shown in FIG. 4.

However, the plurality of databases of the server 410 is not limited to the databases shown in FIG. 4, nor are the databases in FIG. 4 exhaustive in any way. The databases shown in FIG. 4 are provided for exemplary purposes only. For instance, additional databases could include a database that stores reward points, a database that stores the transaction history of the user, or a database that stores a list of the stores that the user has shopped at before.

Whenever a user conducts an action with the GUI Wallet (e.g. dragging-and-dropping a button into a page of a merchant website as shown above in FIG. 2 or FIG. 3, or conducting a financial transaction as further detailed in the description of FIG. 5), the communication engine W 135, the communication engine S 415, the integration engine 420, the plurality of databases (shown in FIG. 4 as 425, 430 and 435) and the server 410 initiate a procedure for sending and receiving data. This procedure is further detailed in the description of the flowchart in FIG. 7. In general, encrypted data is sent from the communication engine W 135 over the bidirectional communication link 402 to the Internet connection 405 and then to the communication engine S 415, where the data is decrypted. Example data encryption methods comprise secure 128-bit encryption or 64-bit encryption methods or Secure Sockets Layer (SSL) encryption methods. After the data is received and decrypted by the communication engine S 415, it is sent to the integration engine 420. The integration engine 420 works with the received data and the plurality of databases—here, shown as the user ID database 425, the financial data database 430 and unsafe website blacklist database 435—in order to properly execute transactions with the online financial transaction program, validate the authenticity of IDs, perform error-checking tasks and execute security checks. Specifically, the integration engine 420 is a business logic interface (any logic or algorithm that handles the information exchange between a database and other software components) that takes the information received by the communication engine S 415 and looks up, verifies and uses data from the plurality of databases in order to effectively conduct transactions. Data coming from the server 410 of the online financial transaction program is sent back to the GUI Wallet in the same manner as described above. Namely, data is first encrypted by the communication engine S 415 and then sent over the bidirectional communication link 402 over the Internet connection 405 to the communication engine W 135, where it is decrypted and then used.

Examples of using the GUI Wallet will be provided in order to further understanding of the plurality of databases in the server 410.

For instance, if the user were to drag-and-drop the f ID button 120 into a User ID Page 210 of a merchant website as described above for FIG. 2, the communication engine W 135 would then communicate this instruction, in encrypted form, over the bidirectional communication link 402 and the Internet connection 405 to the communication engine S 415. The communication engine S 415 would then decrypt the data instruction and send it to the integration engine 420. The integration engine 420 would then locate the proper ID information from the user ID database 425 and then use its logic to place the relevant ID information in the plurality of ID fields 215, as shown in FIG. 2.

A similar process exists if the user were to drag-and-drop any of the plurality of funding source buttons into a Payment Method Page 310 of a merchant website as described above for FIG. 3. The communication engine W 135 would communicate this instruction over the bidirectional communication link 402 and the Internet connection 405 to the communication engine S 415. The communication engine S 415 would then decrypt the data instruction and send it to the integration engine 420. The integration engine 420 would then locate the proper ID information from the financial data database 430 and then use its logic to place the relevant financial data in any of the plurality of entry fields (e.g. 315, 320, 325 or 330) as shown in FIG. 3.

The above described process also enables the alert button 130 of the first tab 100 of the GUI Wallet to issue an alarm, as described above for FIG. 1. Any time a merchant website is browsed, the server 410 of the online financial transaction program is engaged and the integration engine 420 can readily perform lookups with the plurality of databases. If the user is attempting to make a transaction on a potentially unsafe website, the integration engine 420 checks the potentially unsafe website against the websites listed in the unsafe website blacklist database 435. If there is a match, then the communication engine S 415 sends an encrypted message about this unsafe website over the Internet connection 405 and the bidirectional communication link 402 to the communication engine W 135, where it is then decrypted and then sent to the alert button 130 for alerting the user, such as lighting-up a GUI feature or popping up a separate message window.

The above described process also enables message windows to pop up from either the first tab 100 or the second tab 500 of the GUI Wallet to inform the user if a transaction was successful (e.g. a money transfer or currency conversion) or a message window informing the user of a specific piece of information (e.g. a specific balance amount after performing a balance inquiry), as will be further detailed in the description of FIG. 5. Any time a user decides to conduct a financial transaction with the second tab 500 of the GUI Wallet, the server 410 of the online financial transaction program is engaged and the integration engine 420 can readily perform lookups with the plurality of databases. Once the user has completed a transaction, successfully or not, or performed a balance inquiry, the communication engine S 415 sends an encrypted message about the status of the transaction (successful or unsuccessful) or the specific balance amount inquired about over the Internet connection 405 and the bidirectional communication link 402 to the communication engine W 135, where it is then decrypted and then displayed as a message window in the GUI Wallet. For instance, a message window could pop up stating that the transaction (e.g. money transfer or currency conversion) was successful or unsuccessful, or a message window could pop up describing to the user the specific balance of an account the user performed a balance inquiry on. The details of this process will also be described in the descriptions of FIG. 5 and FIG. 7.

FIG. 5 is a diagram of a GUI Wallet with a second tab having a second plurality of buttons according to another embodiment of the invention. The second tab 500 of the GUI Wallet is shown behind the first tab 100 of the GUI Wallet, but the second tab 500 is not limited to this position and can be located anywhere with respect to the first tab 100. Furthermore, the number of tabs of the GUI Wallet is not limited to merely two, and the first tab 100 and second tab 500 are provided only for illustrative purposes. Additional tabs may be added as necessary or as a software engineer sees fit. The second tab 500 includes a plurality of transaction buttons and like FIG. 1, a GUI representation of the communication engine W 135, which is internal to the GUI Wallet software application but can be represented by any GUI indicator, but is shown in FIG. 5 as a generic icon.

The second tab 500 of the GUI Wallet comprises a plurality of transaction buttons which can include, for example, a balance check button 505 ("Bal."), a transfer money button 510 ("Send"), and a currency conversion button 515 ("Con."), as shown in FIG. 5. However, the plurality of transaction buttons is not limited to the aforementioned list, and the above list is not exhaustive in any way. For example, other transaction buttons can include a button that accepts payments or money transfers from another party, a button that can pay bills or set-up bill payments, and a button that can perform any financial transaction that is performed with an online financial transaction program via an Internet browser.

The balance check button 505 is tied to software in the GUI Wallet that has the user's login information already entered, and that is able to retrieve the balance of a given account belonging to the user that is registered with the user's online financial transaction program. For instance, if the user were to select the balance check button 505, a pop-up window with a field querying the user for an account number or other account identifier would appear. After the user enters the account number or other account identifier, the GUI Wallet retrieves and returns to the user the balance of the particular account associated with the provided account number or identifier, usually by means of another message window. The balance check button 505 also works with the communication engine method described above for FIG. 4 and looks up the balance of a particular user account in the plurality of databases, for example the financial data database 430 shown in FIG. 4, and sends this data back to the GUI Wallet from the server in order to have the GUI Wallet display to the user the proper balance of a selected account, for instance in a separate message window.

The transfer money button 510 is tied to software in the GUI Wallet that has the user's login information already entered, and that is able to access the financial data of a user's account and actually transfer money from a user's account to another account or to pay for purchases. For instance, if the user were to select the transfer money button 510, a pop-up window with a field querying the user for a transferee or destination account number and a transfer amount would appear. After the user enters the transferee/destination number and the transfer amount, the GUI Wallet executes the money transfer and then informs the user about whether the money transfer was successful or not, usually by means of another message window or by using the alert window 130 of the first tab 100 of the GUI Wallet. The transfer money button 510 also works with the communication engine method described above for FIG. 4 and is able to work with the plurality of databases in the server 410 and can execute financial transactions (e.g. a money transfer) over the server 410 just as if the user were performing transactions through his or her online financial transaction program website. A data message describing whether the money transfer was successful or not is also sent from the server back to the GUI Wallet in order to have the GUI Wallet display to the user whether or not the money transfer was successful in a separate message window.

The currency conversion button 515 is tied to software in the GUI Wallet that has the user's login information already entered, and that is able to access the financial data of a user's account and actually convert funds from a user's account from one type of currency to another type of currency. For instance, if the user were to select the currency conversion button 515, a pop-up window with a field querying the user for a beginning currency type, a beginning currency amount, and an end currency type would appear. After the user enters the beginning currency type, a beginning currency amount, and an end currency type, the GUI Wallet executes the currency conversion and then informs the user about whether the currency conversion was successful or not, usually by means of another message window or by using the alert button 130 of the first tab 100 of the GUI Wallet. The currency conversion button 515 also works with the communication engine method described above for FIG. 4 and is able to work with the plurality of databases and can execute financial transactions (e.g. currency conversion) over the server 410 just as if the user were performing financial transactions through his or her online financial transaction program website. A data message describing whether the currency conversion was successful or not is also sent from the server back to the GUI Wallet in order to have the GUI Wallet display to the user whether or not the currency conversion was successful in a separate message window.

Again, it is to be reiterated that the plurality of transaction buttons is not limited to the above three described buttons and can comprise buttons that allow a user to perform any other financial transaction that the user would have been able to perform on the user's financial transaction program website with an Internet browser. For instance, other transaction buttons can include a button that accepts payments or money transfers from another party (which may be more applicable if the user was a merchant), and a button that can pay bills or set-up bill payments (on a periodic or non-periodic basis). The use of the plurality of transaction buttons on the second tab 500 of the GUI Wallet is robust, simple and convenient because it allows a user to conduct financial transactions with his or her online financial transaction program seamlessly and securely, independent of an Internet browser.

Figure 6:
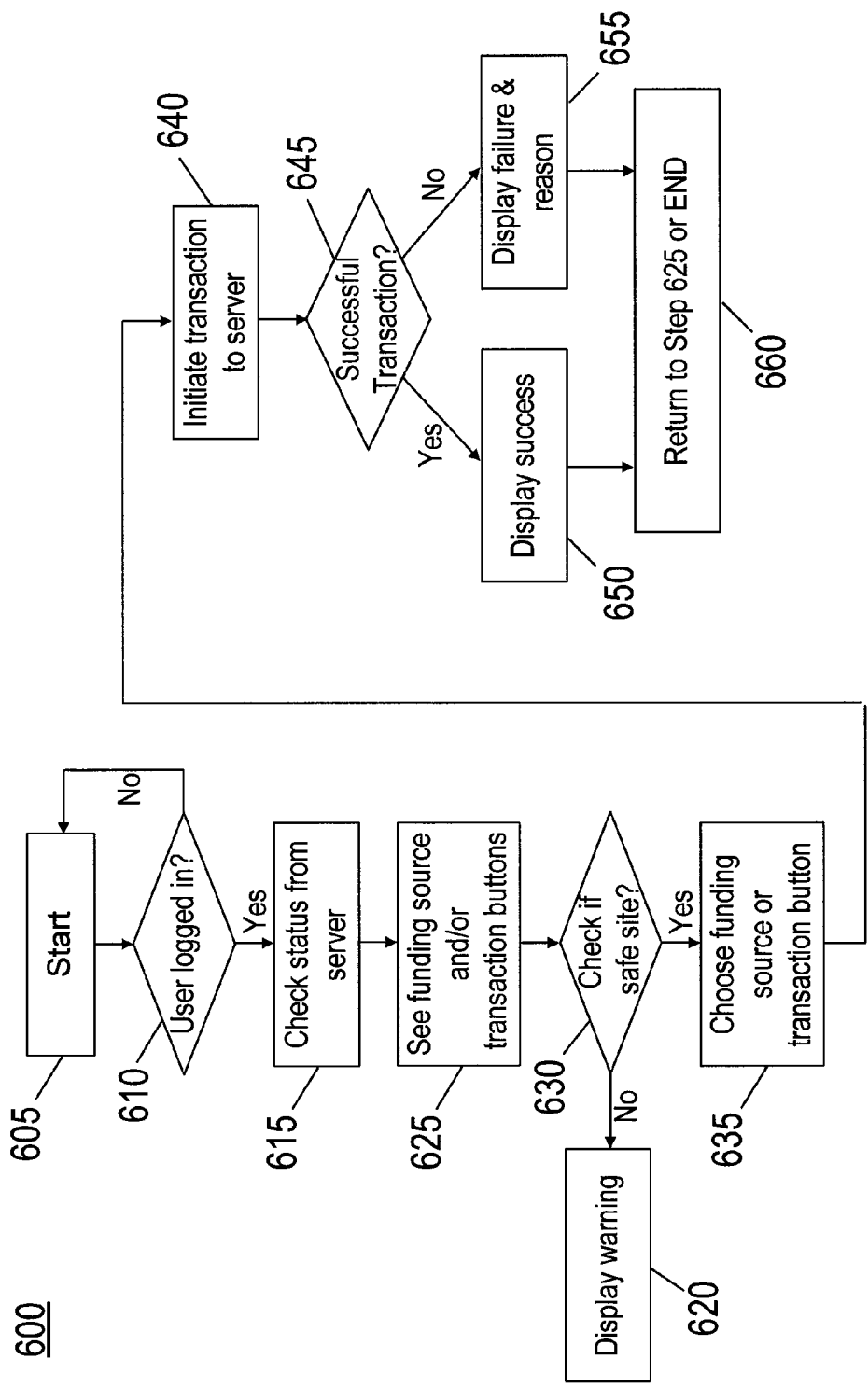
FIG. 6 is a flowchart showing the steps a user takes in using a GUI Wallet to conduct transactions according to another embodiment of the invention.

FIG. 6 is a flowchart showing the steps a user takes in using a GUI Wallet to conduct transactions according to another embodiment of the invention. Method 600 is the process in which the user drags-and-drops a funding source or ID button or pushes a transaction button of the GUI Wallet in order to conduct a transaction with the GUI Wallet. In step 605, the user starts the process and opens up the GUI Wallet application. In step 610, the user supplies relevant log-in data to log-in to the server 410 of the online financial transaction program, shown in FIG. 4. This is usually the username and password a user uses to log-in to his or her account on a central online financial transaction program website. If the user cannot log-in, the user is brought back to step 605, the start of the process. If the user successfully logs in, then in step 615, the user's status and financial information is checked and verified by looking up the data in the financial data database 430 of the server 410 of the online financial transaction program. Then, the GUI Wallet appears on a user's screen, and in step 625, the user is presented with a plurality of buttons, such as the plurality of funding source buttons as well as the ID and alert buttons described in FIG. 1 and the plurality of transaction buttons described in FIG. 5. If the user wishes to use the drag-and-drop functionality of the plurality of funding source buttons, then the user will go to a page of a merchant website in order to make a purchase. Once the user is on the merchant website, the server 410 of the online financial transaction program is engaged, and the server 410 works with the integration engine 420 to check, in step 630, if the merchant website the user is browsing belongs to the blacklist of unsafe websites stored in the unsafe website blacklist database 435.

If the merchant website is unsafe, then in step 620, a warning is displayed either in a separate message window or on the alert button 130 of the first tab 100 of the GUI Wallet. If the merchant website is safe, then the user can continue to choose one of the plurality of funding source buttons to drag-and-drop into a merchant website, or the user can choose to conduct a financial transaction (e.g. transferring money, converting currencies, checking balances) that is independent of a merchant website, in step 635. In step 640, the GUI Wallet and the server 410 communicate in the process described above for FIG. 4 and the method that will be detailed in FIG. 7 in order to conduct the transaction that the user has selected. In step 645, the server 410 determines whether or not the transaction was successful. If the transaction was not successful, a message window is displayed from the GUI Wallet that describes the transaction failure and the reason for failure in step 655. If, on the other hand, the transaction is successful, a message window is displayed from the GUI Wallet that describes the success of the transaction and the reason why the transaction was a success in step 650. Then, in step 660, the user has the choice of returning to step 625 to select another button from the GUI Wallet, or deciding to end method 600. If the user decides to end the method 600, the user starts all over from step 605 and logs in again in step 610.

Figure 7:
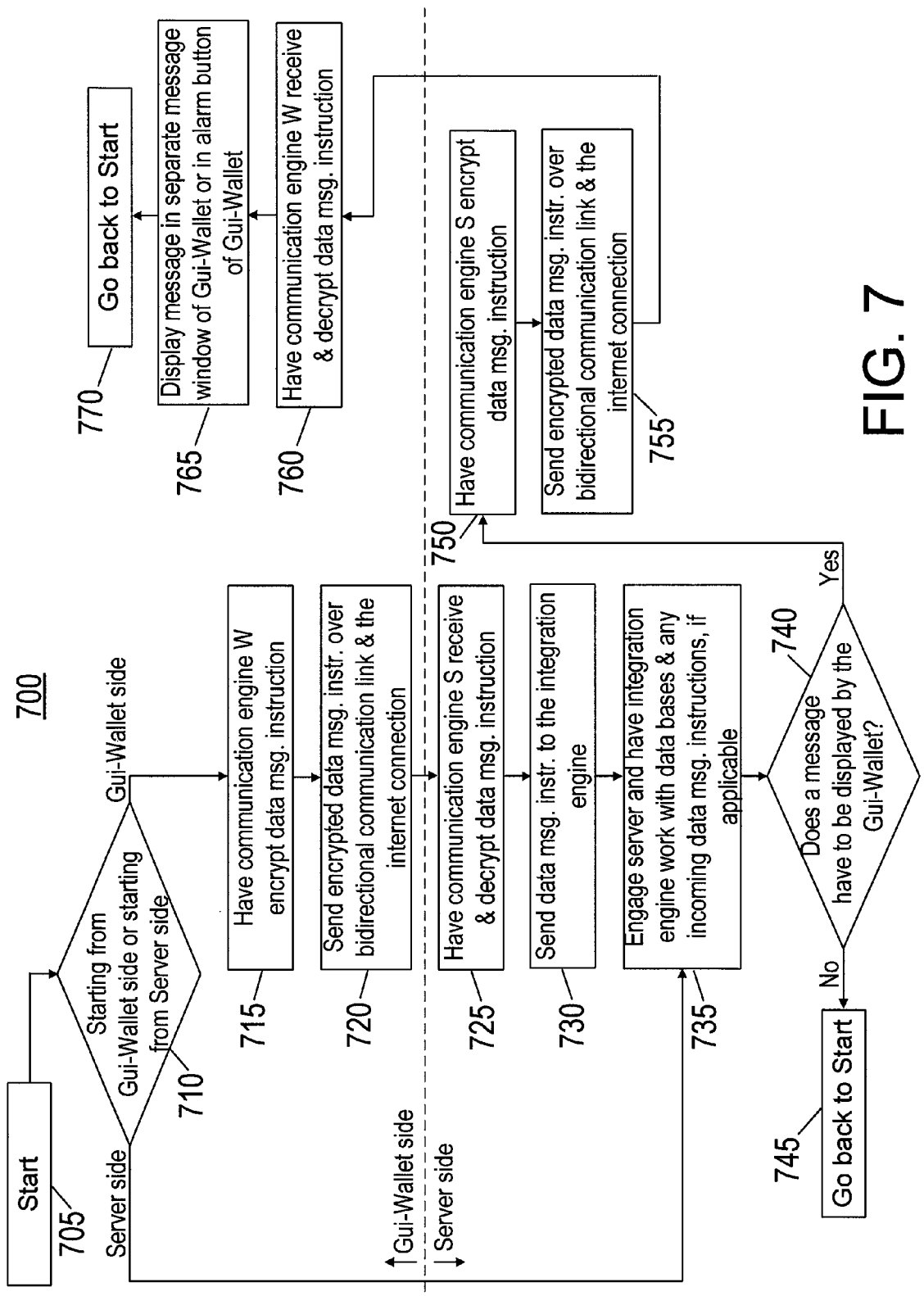
FIG. 7 is a flowchart showing the steps of how the communication engine of the GUI Wallet and the communication engine of the server send and receive data, according to another embodiment of the invention.

FIG. 7 is a flowchart showing the steps of how the communication engine of the GUI Wallet and the communication engine of the server send and receive data, according to another embodiment of the invention. Method 700 is the process in which communication engine W 135 and communication engine S 415 encrypt, send and receive data to one another, as described above for FIG. 4. The method starts in step 705, and in step 710, the method determines whether the processing starts from the GUI Wallet side, or starts from the server side. Basically, the processing starts from the GUI Wallet side if the user is using the first tab 100 of the GUI Wallet and plans to drag-and-drop a button from the plurality of buttons available (e.g. the plurality of funding source buttons or an ID button) into a page of a merchant website. On the other hand, the processing starts from the server side if the user decides to use a transaction button from the plurality of transaction buttons on the second tab 500 of the GUI Wallet. The processing also starts from the server side if the user is simply browsing a merchant website and the merchant website is unsafe, thereby triggering the alarm button 130. If the processing starts from the server side, then the method proceeds to step 735. If the processing starts from the GUI Wallet side, then the method proceeds to step 715, where the communication engine W 135 encrypts a data message instruction, usually by using a secure 64-bit or 128-bit encryption method or a SSL encryption method. A data message instruction usually comprises the software instructions for having the user drag-and-drop a button from the first tab 100 of the GUI Wallet into a page of the merchant website.

Then, in step 720, the encrypted data message instruction is sent over the bidirectional communication link 402 and the Internet connection 405 and crosses into the server side to reach step 725. In step 725, communication engine S 415 receives and decrypts the data message instruction. The communication engine S 415 then sends the decrypted data message instruction to the integration engine 420. In step 735, the server 410 is engaged because the user is browsing a page of the merchant website, and the server 410 is engaged whenever the user is performing Internet browsing. In step 735, the integration engine 420 works with the plurality of databases (shown in FIG. 4 as elements 425, 430 and 435 for exemplary purposes only) and the server 410, as well as any incoming data message instructions sent by the communication engine S 415 to perform any functions. These functions can comprise populating empty fields of a page on a merchant website with user ID data or payment method data, conducting financial transactions with the online financial transaction program (e.g. money transfers, currency conversions, paying for purchases), validating the authenticity of user login IDs, performing error-checking tasks and executing security checks on potentially unsafe websites. Then, after step 735, where the integration engine 420 works with the databases and the server 410 to perform any tasks, the method determines whether a message has to be displayed by the GUI Wallet in order to alert the user on the status of a certain transaction. In the case of a simple drag-and-drop of a funding source or ID button from the first tab 100 of the GUI Wallet, the user does not need to be notified with a message window from the GUI Wallet because the user can immediately see the empty fields of a merchant website page being populated with the user's data. In such a case where a message does not need to be displayed to the user, the method then proceeds to step 745 and goes back to the start, step 705, and then the above mentioned process is repeated.

However, if it is necessary to have a message displayed by the GUI Wallet, and a "Yes" is answered to the inquiry posed in step 740, then the method proceeds to step 750. In step 750, the method is still on the server side, therefore communication engine S 415 encrypts a data message instruction, usually by using a secure 64-bit or 128-bit encryption method or a SSL encryption method. The data message instruction is usually the software instructions for having the user drag-and-drop a button from the first tab 100 of the GUI Wallet into a page of the merchant website. The data message instruction here usually comprises the software instructions for displaying a status message to the user by using the GUI Wallet to display a separate message window or having the alert button 130 light up or animate. This data message instruction is being sent to the GUI Wallet side from the server side because it is ultimately the GUI Wallet that will be displaying the message for the user to view.

In step 755, the encrypted data message is sent by the communication engine S 415 over the bidirectional communication link 402 and the Internet connection 405 over to the GUI Wallet side, where it is received by communication engine W 135 and decrypted in step 760. Then, the GUI Wallet takes the software instruction from the decrypted data message instruction and then displays a message in a separate message window from the GUI Wallet or uses the alarm button 130 of the GUI Wallet to display the warning or message. After the message is displayed, the method proceeds to step 770 and goes back to the start, or step 705.

The message the user will view usually comprises either a successful or unsuccessful completion of a financial transaction (e.g. whether money was successfully transferred, or received, or whether currency has been successfully converted), the balance of a certain account the user has performed a balance inquiry on, or whether the user has reached an unsafe site and informing the user that he or she is currently browsing an unsafe site.

Even though the GUI Wallet comprises a first tab 100 and a second tab 500 and each tab comprises a plurality of different buttons, as described above, the buttons detailed above associated with the first tab 100 do not necessarily have to be placed on the first tab 100 and the buttons detailed above associated with the second tab 500 do not have to be placed on the second tab 500. In other words, the buttons can be placed anywhere with respect to the GUI Wallet. In addition, the GUI Wallet is not limited to just a first tab 100 and a second tab 500 and can comprise any number of tabs, and the buttons can be placed on any of these tabs.

The GUI Wallet can also be customized in any way that a user, a connected system, control logic or another entity sees fit. In other words, buttons on any of the tabs can be moved to other tabs, new tabs can be created, tabs can be removed or modified, existing buttons can be removed or modified, and new buttons can be added. The customizability of the GUI Wallet is intrinsic to the GUI properties of the GUI Wallet and is not limited to the above examples. The GUI Wallet can also be customized to optimize the user experience.

The GUI Wallet and any of the tabs of the GUI Wallet can be written in a language comprising Java, XML, C++ or C, and can also be written in a language with a flexible and user-customizable API where a user can add on features easily without having to understand the intricacies of a particular code. The plurality of databases in the server 410 can be written in a language comprising SQL, Perl, or another database language. The communication engine W 135, the communication engine S 415, and the integration engine 420 can be written in a language comprising C, C++ or Java.

Advantages of the present invention include granting a user the ability to securely and seamlessly conduct transactions with his or her online financial transaction program by means of a computer or a wireless handheld device without having to depend on an Internet browser. A convenient drag-and-drop functionality also enables the user to simply drag-and-drop pre-stored settings and information into empty fields of a page of a merchant website without having to remember account numbers or other ID data or open up a separate page in another Internet browser.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A method for selecting one of a plurality of funding source options and a rewards system option during a payment transaction for automatic population into a payment page of a merchant website via a browser-independent graphical user interface (GUI) application, comprising:

determining, by a user device, the beginning of a first payment transaction and, in response, launching a browser-independent graphical user interface (GUI) application to run on the user device;

providing for display, without the use of an Internet browser by the browser-independent GUI application running on the user device during the first payment transaction, a plurality of selectable funding source options and at least one selectable rewards system option;

receiving from an input device on the user device, without the use of an Internet browser and through the browser-independent GUI application running on the user device during the first payment transaction, a selection of a first funding source option from the plurality of selectable funding source options;

automatically populating, during the first payment transaction by the browser-independent GUI application running on the user device in response to the selection of the first funding source option, one or more funding source fields in a payment page of a merchant website with first funding source information that is stored in a memory system in association with the first funding source option;

receiving from the input device on the user device, without the use of an Internet browser and through the browser-independent GUI application running on the user device during the first payment transaction, a selection of a first reward system option from the at least one selectable rewards system option;

automatically populating, during the first payment transaction by the browser-independent GUI application running on the user device in response to the selection of the first reward system option, one or more rewards system fields in the payment page of the merchant website with first rewards system information that is stored in the memory system in association with the first rewards system option; and providing for display, without the use of an Internet browser by the browser-independent GUI application running on the user device during the first payment transaction, a status of the first payment transaction that is conducted using the first funding source information and the first reward system information.

2. The method of claim 1, wherein prior to the providing for display, without the use of an Internet browser by the browser-independent GUI application running on the user device during the first payment transaction, the plurality of selectable funding source options and the at least one selectable rewards system option, the method further comprises:

authenticating, without the use of an Internet browser by the browser-independent GUI application running on the user device, a user using login credentials.

3. The method of claim 1 further comprising:

providing for display, without the use of an Internet browser by the browser-independent GUI application running on the user device, a balance of an account corresponding to the first funding source option.

4. The method of claim 3, wherein the balance is provided for display a plurality of different times, and includes a first balance that is provided for display at a first time and that includes a first amount of currency in the account corresponding to the first funding source option before the payment transaction has been completed, and a second balance that is provided for display at a second time and that includes a second amount of currency in the account corresponding to the first funding source option after the payment transaction has been completed.

5. The method of claim 1, wherein the first funding source information is populated in the one or more funding source fields in the payment page of a first merchant website, and the method further comprises:

receiving from the input device on the user device, without the use of an Internet browser and through the browser-independent GUI application running on the user device during a second payment transaction that is subsequent to completion of the first payment transaction, a selection of a second funding source option from the plurality of selectable funding source options, wherein the second funding source option is different than the first funding source option;

automatically populating, during the second payment transaction by the browser-independent GUI application running on the user device in response to the selection of the second funding source option, one or more funding source fields in a payment page of a second merchant website with second funding source information that is different than the first funding source information and that is stored in the memory system in association with the second funding source option, wherein the second merchant website is different than the first merchant website.

6. The method of claim 1, wherein the first rewards system information is populated in the one or more rewards system fields in the payment page of a first merchant website, and the method further comprises:
receiving from the input device on the user device, without the use of an Internet browser and through the browser-independent GUI application running on the user device during a second payment transaction that is subsequent to completion of the first payment transaction, a selection of a second rewards system option from the at least one selectable rewards system option, wherein the second rewards system option is different than the first rewards system option;
automatically populating, during the second payment transaction by the browser-independent GUI application running on the user device in response to the selection of the second rewards system option, one or more rewards system fields in a payment page of a second merchant website with second rewards system information that is different than the first rewards system information and that is stored in the memory system in association with the second rewards system option, wherein the second merchant website is different than the first merchant website.

7. The method of claim 1 further comprising:
providing for display, without the use of an Internet browser by the browser-independent GUI application running on the user device, a currency conversion and a website security message, wherein the currency conversion comprises a conversion between a starting currency and an ending currency, and wherein the website security message comprises a determination of whether the merchant website is a potentially unsafe website.

8. A browser-independent graphical user interface (GUI) application system for selecting one of a plurality of funding source options and a rewards system option during a payment transaction for automatic population into a payment page of a merchant website, comprising:
an input device;
a non-transitory memory storing instructions for providing a browser-independent graphical user interface (GUI) application; and
one or more hardware processors coupled to the input device and the non-transitory memory, wherein the one or more hardware processors are configured to read instructions stored on the non-transitory memory to cause the system to Perform operations comprising:
determine the beginning of a first payment transaction and, in response, launching the browser-independent GUI application;
provide for display, without the use of an Internet browser via the browser independent GUI application during the first payment transaction, a plurality of selectable funding source options and at least one selectable rewards system option;
receive from the input device, without the use of an Internet browser and via the browser independent GUI application during the first payment transaction, a selection of a first funding source option from the plurality of selectable funding source options;
automatically populate, during the first payment transaction via the browser independent GUI application in response to the selection of the first funding source option, one or more funding source fields in a payment page of a merchant website with first funding source information that is stored in the non-transitory memory system in association with the first funding source option;
receive from the input device, without the use of an Internet browser and via the browser independent GUI application during the first payment transaction, a selection of a first rewards system option from the at least one selectable rewards system option;
automatically populate, during the first payment transaction via the browser independent GUI application in response to the selection of the first rewards system option, one or more rewards system fields in the payment page of the merchant website with first rewards system information that is stored in the non-transitory memory in association with the first rewards system option; and
provide for display, without the use of an Internet browser via the browser independent GUI application during the first payment transaction, a status of the first payment transaction that is conducted using the first funding source information and the first rewards system information.

9. The system of claim 8, wherein prior to the providing for display, without the use of an Internet browser via the browser independent GUI application during the first payment transaction, the plurality of selectable funding source options and the at least one selectable rewards system option, the one or more hardware processors are further configured to read the instructions and, in response, cause the system to perform further operations comprising:
authenticate a user using login credentials received.

10. The system of claim 8, wherein the one or more hardware processors are further configured to read the instructions and, in response, cause the system to perform further operations comprising:
provide for display, without the use of an Internet browser via the browser independent GUI application, a balance of an account corresponding to the first funding source option.

11. The system of claim 10, wherein the balance is provided for display at a plurality of different times, and includes a first balance that is provided for display at a first time and that includes a first amount of currency in the account corresponding to the first funding source option before the payment transaction has been completed, and a second balance that is provided for display at a second time and that includes a second amount of currency in the account corresponding to the first funding source option after the payment transaction has been completed.

12. The system of claim 8, wherein the first funding source information is populated in the one or more funding source fields in the payment page of a first merchant website, and the one or more hardware processors are further configured to read the instructions and, in response, cause the system to perform further operations comprising:
receive from the input device, without the use of an Internet browser and via the browser-independent GUI application during a second payment transaction that is subsequent to completion of the first payment transaction, a selection of a second funding source option from the plurality of selectable funding source options, wherein the second funding source option is different than the first funding source option;

automatically populate, during the second payment transaction via the browser-independent GUI application in response to the selection of the second funding source information, one or more funding source fields in a payment page of a second merchant website with second funding source information that is different than the first funding source information and that is stored in the non-transitory memory in association with the second funding source option, wherein the second merchant website is different than the first merchant website.

13. The system of claim 8, wherein the first rewards system information is populated in the one or more rewards system fields in the payment page of a first merchant website, and the one or more hardware processors are further configured to read the instructions and, in response, cause the system to perform further operations comprising:

receive from the input device, without the use of an Internet browser and via the browser-independent GUI application during a second payment transaction that is subsequent to completion of the first payment transaction, a selection of a second rewards system option from the at least one selectable rewards system option, wherein the second rewards system option is different than the first rewards system option;

automatically populate, during the second payment transaction via the browser-independent GUI application in response to the selection of the second rewards system option, one or more rewards system fields in a payment page of a second merchant website with second rewards system information that is different than the first rewards system information and that is stored in the non-transitory memory in association with the second rewards system option, wherein the second merchant website is different than the first merchant website.

14. The system of claim 8, wherein the one or more hardware processors are further configured to read the instructions and, in response, cause the system to perform further operations comprising:

provide for display, without the use of an Internet browser via the browser-independent GUI application, a currency conversion and a website security message, wherein the currency conversion comprises a conversion between a starting currency and an ending currency, and wherein the website security message comprises a determination of whether the merchant website is a potentially unsafe website.

15. A non-transitory machine-readable medium having stored thereon machine-readable instructions executable to cause a machine to provide a browser-independent graphical user interface (GUI) application that is configured to perform operations comprising:

launch in response to determining the beginning of a first payment transaction;

provide for display, without the use of an Internet browser during the first payment transaction, a plurality of selectable funding source options and at least one selectable rewards system option;

receive from an input device, without the use of an Internet browser during the first payment transaction, a selection of a first funding source option from the plurality of selectable funding source options;

automatically populate, during the first payment transaction in response to the selection of the first funding source option, one or more funding source fields in a payment page of a merchant website with first funding source information that is stored in a memory system in association with the first funding source option;

receive from the input device, without the use of an Internet browser during the first payment transaction, a selection of a first rewards system option from the at least one selectable rewards system option;

automatically populate, during the first payment transaction in response to the selection of the first rewards system option, one or more rewards system fields in the payment page of the merchant website with first rewards system information that is stored in the memory system in association with the first rewards system option; and provide for display, without the use of an Internet browser, during the first payment transaction, a status of the first payment transaction that is conducted using the first funding source information and the first rewards system information.

16. The non-transitory machine readable medium of claim 15, wherein the browser-independent graphical user interface (GUI) application is configured to perform operations further comprising:

provide for display, without the use of an Internet browser, a balance of an account corresponding to the first funding source option.

17. The non-transitory machine readable medium of claim 16, wherein the balance is provided for display a plurality of different times, and includes a first balance that is provided for display at a first time and that includes a first amount of currency in the account corresponding to the first funding source option before the payment transaction has been completed, a second balance that is provided for display at a second time and that includes a second amount of currency in the account corresponding to the first funding source option after the payment transaction has been completed.

18. The non-transitory machine readable medium of claim 15, wherein the first funding source information is populated in the one or more funding source fields in the payment page of a first merchant website, and wherein the browser-independent graphical user interface (GUI) application is configured to perform operations further comprising:

receive from the input device, without the use of an Internet browser during a second payment transaction that is subsequent to the completion of the first payment transaction, a selection of a second funding source option from the plurality of selectable funding source options, wherein the second funding source option is different than the first funding source option;

automatically populate, during the second payment transaction in response to the selection of the second funding source option, one or more funding source fields in a payment page of a second merchant website with second funding source information that is different than the first funding source information and that is stored in the memory system in association with the second funding source option, wherein the second merchant website is different than the first merchant website.

19. The non-transitory machine readable medium of claim 15, wherein the first rewards system information is populated in the one or more rewards system fields in the payment page of a first merchant website, and wherein the browser-independent graphical user interface (GUI) application is configured to perform operations further comprising:

receive from the input device, without the use of an Internet browser during a second payment transaction that is subsequent to the completion of the first payment transaction, a selection of a second rewards system option from the at least one selectable rewards system option, wherein the second rewards system option is different than the first rewards system option;

automatically populate, during the second payment transaction in response to the selection of the second rewards system option, one or more rewards system fields in a payment page of a second merchant website with second rewards system information that is different than the first rewards system information and that is stored in the memory system in association with the second rewards system option, wherein the second merchant website is different than the first merchant website.

20. The non-transitory machine readable medium of claim 15, wherein the browser-independent graphical user interface (GUI) application is configured to perform operations further comprising:

provide for display, without the use of an Internet browser, a currency conversion and a website security message, wherein the currency conversion comprises a conversion between a starting currency and an ending currency, and wherein the website security message comprises a determination of whether the merchant website is a potentially unsafe website.

\* \* \* \* \*